United States Patent [19]
Satoh et al.

[11] Patent Number: 5,650,237
[45] Date of Patent: Jul. 22, 1997

[54] MAGNETIC RECORDING MEDIUM HAVING A METALLIC MAGNETIC LAYER AND AN ALUMINUM ALLOY UNDERLAYER

[75] Inventors: Takeshi Satoh; Tsutomu Isobe, both of Tochigi, Japan

[73] Assignee: KAO Corporation, Tokyo, Japan

[21] Appl. No.: 561,449

[22] Filed: Nov. 21, 1995

[30] Foreign Application Priority Data

Nov. 21, 1994 [JP] Japan ................................. 6-286947
Nov. 21, 1994 [JP] Japan ................................. 6-286948

[51] Int. Cl.$^6$ ............................................. G11B 5/66
[52] U.S. Cl. .......................... 428/611; 428/141; 428/216; 428/336; 428/408; 428/457; 428/651; 428/694 TS; 428/694 TP; 428/694 SG; 428/694 TR; 428/900
[58] Field of Search ........................ 428/141, 212, 428/216, 336, 408, 457, 611, 651, 694 TS, 694 TP, 694 SG, 694 TR, 900

[56] References Cited

U.S. PATENT DOCUMENTS

| | | | |
|---|---|---|---|
| 4,647,494 | 3/1987 | Meyerson et al. | 428/216 |
| 4,833,020 | 5/1989 | Shiroishi et al. | 428/336 |
| 5,079,062 | 1/1992 | Masuda et al. | 428/64 |
| 5,091,225 | 2/1992 | Goto | 427/430.1 |
| 5,314,745 | 5/1994 | Okumura | 428/336 |
| 5,413,835 | 5/1995 | Ikeda et al. | 428/141 |

FOREIGN PATENT DOCUMENTS 0 399 747  11/1990  European Pat. Off. .
0 583 989   2/1994  European Pat. Off. .

OTHER PUBLICATIONS

Databse WPI, Derwent Publications, AN–89–057010/08, JP-A-1008511, Jan. 12, 1989.

*Primary Examiner*—Stevan A. Resan
*Attorney, Agent, or Firm*—Oblon, Spivak, McClelland, Maier & Neustadt, P.C.

[57] ABSTRACT

A magnetic recording medium is disclosed, which contains a substrate, an uneven layer and a metallic magnetic layer provided on the substrate in that order, wherein the uneven layer is made of an Al—M (wherein M is a metal capable of forming a carbide) and has an uneven surface. This magnetic recording medium enables a magnetic head to float at a low height, and prevents the magnetic head from sticking to the magnetic recording medium. Further, the uneven layer has an excellent adhesivity to the substrate preventing it from peeling off the substrate, and thus a magnetic recording medium having an appropriate surface roughness and excellent durability is provided. This magnetic recording medium can cope with high density recordings.

20 Claims, 1 Drawing Sheet

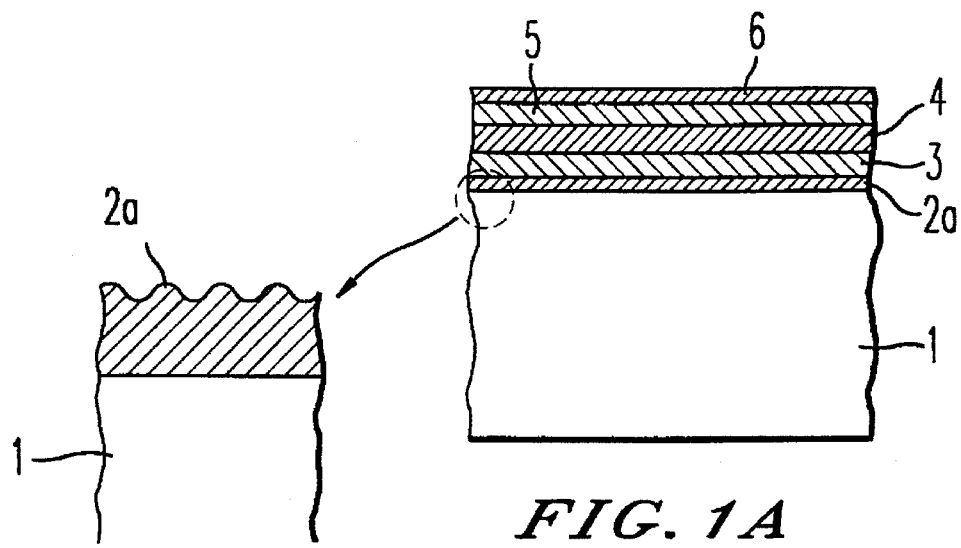
FIG. 1A
FIG. 1B
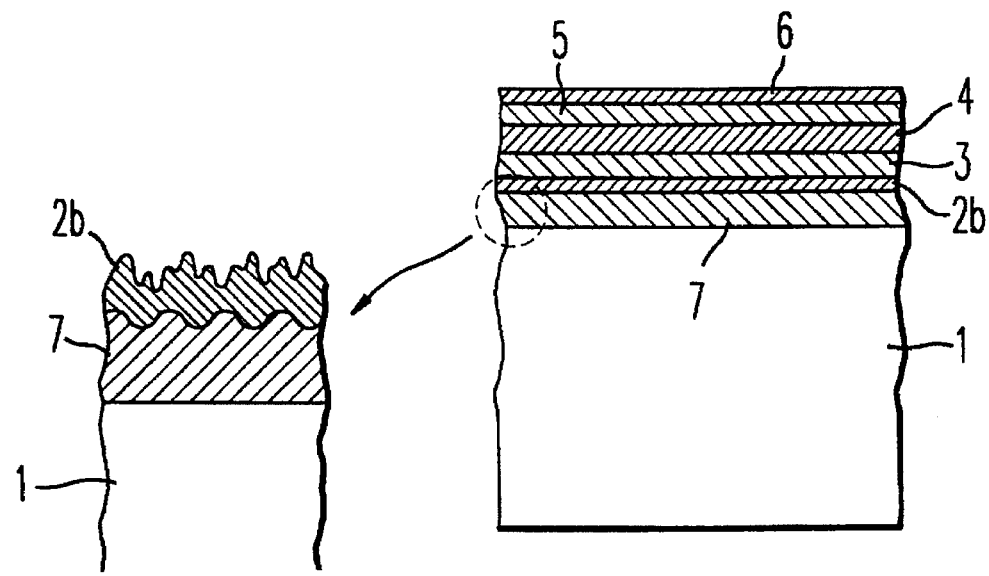
FIG. 2B FIG. 2A

MAGNETIC RECORDING MEDIUM HAVING A METALLIC MAGNETIC LAYER AND AN ALUMINUM ALLOY UNDERLAYER

BACKGROUND OF THE INVENTION

1. Field of the Invention

The present invention relates to a magnetic recording medium such as a magnetic disc having a low friction coefficient and an excellent durability.

2. Discussion of Background

The magnetic disc for use in external memories for computer or the like require a shortened distance between the magnetic disc and the magnetic head, i.e., a decreased floating height of the magnetic head to provide a higher reproduction output. For this purpose, the surface of the magnetic disc is preferably smooth. However, when the surface of the magnetic disc is too smooth, the magnetic head may stick to the magnetic disc, thereby causing damage to the magnetic disc or the magnetic head. Therefore, the substrate is subjected to a texture treatment to provide an appropriate surface roughness.

As the texture treatment, there have been heretofore proposed several methods. For example, a mechanical polishing process has been proposed for aluminum substrates. For glass substrates, a chemical etching process (JP-A-64-37718 (The term "JP-A" as used herein means an "unexamined published Japanese patent application")) and the application of a particle-containing coating (JP-A-1-194128), have been proposed. For carbon substrates, thermal oxidation (JP-A-4-214225) has been proposed. However, these methods are insufficient to meet current requirements for further decreasing the floating height of the magnetic head.

A texture treatment which can further decrease the floating height of the magnetic head, while maintaining excellent durability is needed, i.e., a surface that has both an appropriate roughness, and a sufficient smoothness.

A variety of techniques meeting these demands have been proposed. Examples include a method which comprises the vacuum evaporation of a low melting metal such as Sn and In to form an unevenness (as disclosed in JP-A-60-211614, JP-A-61-240429), a method which comprises sputtering of low melting metal such as Al and Cu to form a discontinuous islands (as disclosed in JP-A-3-73419), and a method which comprises using high melting metals such as Cr, Mo and W to form a roughened surface (as disclosed in JP-A-2-267722).

These methods have the advantage in that texture treatment and formation of a magnetic layer can be carried out in a vacuum system consecutively. However, these methods have some disadvantages. For example, if a single low melting metal is used, the resulting unevenness has poor roughness, and is peelable due to a poor adhesivity to the substrate, rendering its use impractical. Further, if a high melting metal is used, the resulting unevenness has poor roughness and poor durability (CSS properties).

SUMMARY OF THE INVENTION

The inventors have made extensive studies of the foregoing problems. As a result, they have discovered that if an Al—M alloy layer (uneven layer) containing a metal M capable of forming a carbide is provided on a carbon substrate, the carbon present in the carbon substrate and the metal M which forms a carbide provides a firm bond therebetween. Furthermore, because of this, if a metallic magnetic layer is provided on the Al—M alloy layer, directly or via an undercoat layer, an appropriate unevenness can be formed on the surface thereof, providing a low friction coefficient and excellent durability. In addition, the problem of peeling is solved.

An object of the present invention is to provide a magnetic recording medium which enables a low-height floating of a magnetic head to float at a low height in order to cope with a high density recording, which does not cause sticking of the magnetic head. A further object of the invention is to provide a magnetic recording medium which has an uneven layer which adheres to the substrate sufficiently to avoid peeling off, and which has appropriate surface roughness and excellent durability.

The objects of the present invention are accomplished with a magnetic recording medium having a substrate, an uneven layer and a metallic magnetic layer provided on the substrate, in that order, wherein the uneven layer is made of an Al—M (wherein M is a metal capable of forming a carbide) alloy material, and has an uneven surface.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 1A and 1B are schematic diagrams of an embodiment of the magnetic recording medium according to the present invention.

FIGS. 2A and 2B are schematic diagrams of another embodiment of the magnetic recording medium according to the present invention.

In the figures, the reference numerals 1, 2a, 2b, 3, 4, 5, 6 and 7, respectively, indicate a carbon substrate, an Al-1 wt. % Si alloy layer, an Al-10 wt. % Si alloy layer, a Cr layer, a CoCrPt alloy magnetic layer, a protective layer, a lubricant layer and a layer made of metal M'.

DETAILED DESCRIPTION OF THE INVENTION

In the present invention, the uneven layer is preferably a continuous layer having an uneven surface as shown in FIGS. 1A and 1B. The thickness of the uneven layer is preferably from 5 nm to 100 nm and all values therebetween.

Further, it is preferred that a Cr layer (undercoat layer) made of Cr or a Cr alloy is provided between the uneven layer and the metallic magnetic layer. It is also preferred that a protective layer is provided on the metallic magnetic layer.

In the present invention, the substrate may be magnetic or non-magnetic, but is normally non-magnetic. For example, carbon (as disclosed in JP-B-63-46004 (the term "JP-B" as used herein means an "examined Japanese patent publication"), JP-A-3-11005), a tempered glass, a crystallized glass, aluminum, an aluminum alloy, titanium, a titanium alloy, a ceramic, a resin, or a composite material thereof, may be used. Among these substrate materials, carbon, particularly glassy carbon, which exhibits a high heat resistance and produces less gas when heated during sputtering of the magnetic layer, and the like is particularly preferred in the present invention.

The Al—M (M is a metal capable, of forming a carbide) alloy layer (uneven layer) is provided directly, for example, on a carbon substrate having an Ra (center line average roughness) of from 0.5 to 0.9 nm. Examples of the Al—M alloy include Al—M alloys wherein M is at least one elements selected from the group consisting of Si, Cr, Ta, Ti, Zr, Y, Mo, W and V. Specific examples include Al—Si alloys (preferably having a Si content of from 0.2 to 15% by weight, more preferably from 1 to 10% by weight), Al—Cr alloys (preferably having a Cr content of from 0.1 to 10% by weight, more preferably from 1 to 5% by weight), Al—Ta alloys (preferably having a Ta content of from 0.1 to 3% by weight, more preferably from 1 to 2% by weight), Al—Ti alloys (preferably having a Ti content of from 0.5 to 15% by weight, more preferably from 1 to 10% by weight), Al—Zr alloys (preferably having a Zr content of from 0.1 to 9% by weight, more preferably from 1 to 5% by weight), Al—Y alloys (preferably having a Y content of from 0.1 to 10% by weight, more preferably from 1 to 5% by weight), Al—Mo alloys (preferably having a Mo content of from 0.2 to 10% by weight, more preferably from 1 to 5% by weight), Al—W alloys (preferably having a W content of from 0.2 to 10% by weight, more preferably from 1 to 8% by weight), and Al—V alloys (preferably having a V content of from 0.5 to 10% by weight, more preferably from 1 to 5% by weight). In addition, tertiary or higher Al alloys, such as Al-5 wt % Si-5 wt % Cr, Al-5 wt % Si-3 wt % Mo and Al-5 wt % Si-3 wt % W, are also included. Among these alloys, Al—Si and Al—Cr are particularly preferred.

The Al—M alloy layer may be provided by PVD method such as vacuum deposition, sputtering and ion plating. The temperature of the carbon substrate during this process is preferably from 80° C. to 500° C., more preferably from 120° C. to 350° C. The thickness of the Al—M alloy layer is preferably from 5 nm to 100 nm, more preferably from 5 nm to 60 nm. The Al—M alloy layer may be in the form of a discontinuous islands. However, taking into account the adhesivity, the Al—M alloy layer is preferably a continuous layer having an uneven structure on the surface, as shown in FIGS. 1A and 1B. When the Al—M alloy layer is formed by a PVD method, controlled to have a thickness in the above specified range, the resulting Al—M alloy layer has an appropriate unevenness (Ra is from 1 to 5 nm, and all values therebetween, preferably from 1 to 3 nm, and Rp (maximum center line height) is from 2 to 30 nm and all values therebetween, preferably from 3 to 8 nm) on the surface thereof. Accordingly, if the magnetic layer and the other layers, are formed on an Al—M alloy layer having an unevenness on the surface, the unevenness is followed by these other layers, thereby giving an appropriately roughened surface to the magnetic recording medium. This can prevent the magnetic head from sticking to the surface of the magnetic recording medium, providing excellent durability.

In the present invention, a metallic layer made of a metal M' (M' may be the same as or different from M and represents a metal element capable of forming a carbide, preferably selected from the group consisting of Si, Cr, Ta, Ti, Zr, Y, Mo, W and V) may be provided under the Al—M alloy layer, i.e., directly on the substrate. In this case, it is preferred that the metallic layer is formed with appropriate unevenness on its surface. As shown in FIGS. 2A and 2B, the unevenness is preferably followed by the Al—M alloy layer, thereby combining with the unevenness on the surface of the Al—M alloy layer itself, forming an unevenness on the surface of the Al—M alloy layer greater than that formed by the Al—M alloy layer alone.

The thickness of the metallic layer is preferably from 10 nm to 200 nm and all values therebetween. Further, it is preferred that, similar to the Al—M alloy layer, the metallic layer is formed as a continuous layer, as shown in FIGS. 2A and 2B.

In order to provide the metallic layer, a layer made of the metal M' (e.g., a Ti layer, a Mo layer, a W layer, a Si layer, a Cr layer, a Ta layer, a Zr layer, a Y layer, or a V layer) may be deposited directly on a carbon substrate with a thickness of from 10 nm to 200 nm by a PVD method, such as vacuum deposition, sputtering and ion plating. When a Ti layer is formed, its thickness is preferably from 10 nm to 150 nm, more preferably from 50 nm to 120 nm. When a Mo layer is formed, its thickness is preferably from 10 nm to 120 nm, more preferably from 50 nm to 100 nm. When a W layer is formed, its thickness is preferably from 10 nm to 120 nm, more preferably from 40 nm to 100 nm. When a Si layer is formed, its thickness is preferably from 10 nm to 150 nm, more preferably from 40 nm to 120 nm. When a Cr layer is formed, its thickness is preferably from 5 nm to 200 nm, more preferably from 30 nm to 120 nm. When a Ta layer is formed, its thickness is preferably from 10 nm to 130 nm, more preferably from 50 nm to 120 nm. When a Zr layer is formed, its thickness is preferably from 10 nm to 150 nm, more preferably from 50 nm to 120 nm. When a Y layer is formed, its thickness is preferably from 10 nm to 140 nm, more preferably from 50 nm to 130 nm. When a V layer is formed, its thickness is preferably from 10 nm to 140 nm, more preferably from 60 nm to 120 nm. In this arrangement, an appropriate unevenness (Ra is from 0.9 nm to 1.1 nm, and Rp is from 2 nm to 4 nm) is formed on the surface of the metallic layer.

The magnetic recording medium of the present invention is of the thin metal film type. The thin metal film type magnetic layer is formed on the substrate by a PVD method. Examples of the material constituting the magnetic layer include a Co magnetic alloy mainly composed of Co, such as CoCr, CoCrX, CoNiX and CoWX, wherein X is one or more elements selected from the group consisting of Ta, Pt, Au, Ti, V, Cr, Ni, W, La, Ce, Pr, Nd, Pm, Sm, Eu, Li, Si, B, Ca, As, Y, Zr, Nb, Mo, Ru, Rh, Ag, Sb and Hr. Among the foregoing Co magnetic alloys, CoCr and CoCrPt are preferred. The thickness of the magnetic layer is normally from 30 nm to 100 nm and all values therebetween.

As an undercoat layer (provided on the Al—M alloy layer) for the thin metal film-type magnetic layer, a non-magnetic layer made of Cr or a Cr alloy, may be formed by a PVD method. The non-magnetic undercoat layer (Cr layer) is provided to enhance the orientability of the magnetic layer to be formed thereon. The thickness of the undercoat layer is preferably from 10 nm to 100 nm and all values therebetween.

In the thin metal film-type magnetic recording medium, a protective layer is normally provided on the magnetic layer by a PVD method or CVD method. As a material constituting the protective layer, one having a high hardness is preferred from the standpoint of abrasion resistance. Examples of the protective layer material include oxides, nitrides and carbides of metals such as Al, Si, Ti, Cr, Zr, Nb, Mo, Ta and W. In addition, carbon, boron nitride, and the like, may also be used. In particular, carbon materials such as glassy carbon, diamond-like carbon and a composite of carbon with ceramics, are preferred. The thickness of the protective layer is preferably from 10 nm to 30 nm and all values therebetween.

In order to enhance running properties, a lubricant layer having a thickness of from 0.5 nm to 10 nm, and all values therebetween may be provided on the protective layer. As the lubricant for forming the lubricant layer, a lubricant having a polar group in its molecule or a lubricant free of polar group may be used, either individually or in combination, but preferably in combination. For example, application of a solution of a lubricant having polar group may be followed by an application of a solution of a lubricant free of polar group. Alternatively, a mixture of a solution of a lubricant having polar group and a solution of a lubricant free of polar group may be applied. In this manner, the lubricant having polar group may be present in a lower layer close to the protective layer, while the lubricant free of polar group may be present in a upper layer further from the protective layer. An example of a lubricant having polar group employable herein is a perfluoropolyether lubricant having a molecular weight of from 2,000 to 4,000 and preferably terminated by aromatic ring(s). In particular, a perfluoropolyether lubricant with a molecular weight of from 2,000 to 4,000, having a skeleton —$(CF_2CF_2O)_n$—$(CF_2O)_m$—, and terminated by aromatic ring is preferred. Specific examples of the perfluoropolyether lubricant include FONBRIN AM2001 (available from Monte Cassino Corp.) and DEMNAM SP (available from Daikin Industries, Ltd.). As the lubricant free of polar group at its terminal, a perfluoropolyether lubricant having a molecular weight of from 2,000 to 10,000 is preferred. In particular, a pefluoropolyether lubricant with a molecular weight of from 2,000 to 10,000 and represented by the formula $CF_3$—$(CF_2CF_2O)_l$—$(CF_2O)$—$CF_3$ is preferred. A specific example of the perfluoropolyether lubricant includes FONBRIN Z03 (available from Monte Cassino Corp.).

As mentioned above, the magnetic recording medium having the foregoing constitution comprises an Al—M (M is a metal capable of forming a carbide) alloy layer having an appropriate unevenness (Ra is preferably from 1 nm to 5 nm) formed thereon. The Al—M alloy layer is firmly bonded to the substrate. A magnetic layer or Cr undercoat layer is firmly bonded to the Al—M alloy layer. In this arrangement, a high adhesivity of the layers can be provided. Further, since the magnetic recording medium has an appropriate unevenness on its surface, it exhibits a low friction coefficient, excellent running properties and excellent durability (CSS durability).

Having generally described this invention, a further understanding can be obtained by reference to certain specific examples which are provided herein for purpose of illustration only and are not intended to limiting unless otherwise specified.

EXAMPLE 1

A glassy carbon having a density of 1.5 g/cm³ and a Vickers hardness of 650 was used to prepare a carbon substrate 1. The carbon substrate 1 had an Ra of 0.8 nm as determined by a stylus-type profilometer.

A 20-nm thick Al-1 wt % Si alloy layer 2 was sputtered onto the carbon substrate 1 by DC magnetron sputtering at an Ar gas pressure of 2 mTorr and a carbon substrate temperature of 250° C. The Al-1 wt % Si alloy layer 2 was a continuous layer as shown in FIGS. 1A and 1B and an unevenness of a structure as like many islands on sea (Ra: 1.5 nm) was formed on its surface.

A 40-nm thick Cr layer 3 on which a 50-nm thick CoCrPt alloy magnetic layer 4 was further provided was sputtered onto the surface of the Al—Si layer 2 by DC magnetron sputtering at an Ar gas pressure of 2 mTorr and a carbon substrate temperature of 260° C.

A 15-nm thick protective layer (glassy carbon layer) 5 was sputtered onto the surface of the CoCrPt alloy magnetic layer 4 by DC magnetron sputtering.

Thereafter, a solution of FONBRIN Z03 was applied to the protective layer to form a 15-Å thick lubricant layer 6. Thus, a magnetic disc was obtained as shown in FIGS. 1A and 1B.

EXAMPLES 2 TO 30

Magnetic discs were obtained in the same manner as in Example 1 except that the 20-nm thick Al-1 wt % Si alloy layer was replaced by 20-nm thick Al—X alloy layers set forth in Table 1 below, respectively.

TABLE 1

| Example No. | Al—X alloy layer |
| --- | --- |
| Example 2 | Al-5 wt % Si alloy layer |
| Example 3 | Al-10 wt % Si alloy layer |
| Example 4 | Al-1 wt % Cr alloy layer |
| Example 5 | Al-3 wt % Cr alloy layer |
| Example 6 | Al-5 wt % Cr alloy layer |
| Example 7 | Al-1 wt % W alloy layer |
| Example 8 | Al-4 wt % W alloy layer |
| Example 9 | Al-8 wt % W alloy layer |
| Example 10 | Al-1 wt % Ti alloy layer |
| Example 11 | Al-5 wt % Ti alloy layer |
| Example 12 | Al-10 wt % Ti alloy layer |
| Example 13 | Al-1 wt % Ta alloy layer |
| Example 14 | Al-1.5 wt % Ta alloy layer |
| Example 15 | Al-2 wt % Ta alloy layer |
| Example 16 | Al-1 wt % Zr alloy layer |
| Example 17 | Al-3 wt % Zr alloy layer |
| Example 18 | Al-5 wt % Zr alloy layer |
| Example 19 | Al-1 wt % Y alloy layer |
| Example 20 | Al-3 wt % Y alloy layer |
| Example 21 | Al-5 wt % Y alloy layer |
| Example 22 | Al-1 wt % V alloy layer |
| Example 23 | Al-3 wt % V alloy layer |
| Example 24 | Al-5 wt % V alloy layer |
| Example 25 | Al-1 wt % Mo alloy layer |
| Example 26 | Al-3 wt % Mo alloy layer |
| Example 27 | Al-5 wt % Mo alloy layer |
| Example 28 | Al-5 wt % Si-5 wt % Cr alloy layer |
| Example 29 | Al-5 wt % Si-5 wt % Mo alloy layer |
| Example 30 | Al-5 wt % Si-3 wt % W alloy layer |

EXAMPLE 31

A magnetic disc was prepared in the same manner as in Example 1 except that the carbon substrate was replaced by a tempered glass substrate.

EXAMPLE 32

A magnetic disc was prepared in the same manner as in Example 1 except that the carbon substrate was replaced by a NiP-plated Al alloy substrate.

EXAMPLE 33

A magnetic disc was prepared in the same manner as in Example 6 except that the carbon substrate was replaced by a tempered glass substrate.

EXAMPLE 34

A magnetic disc was prepared in the same manner as in Example 6 except that the carbon substrate was replaced by a NiP-plated Al alloy substrate.

COMPARATIVE EXAMPLE 1

A magnetic disc was prepared in the same manner as in Example 1 except that the 20-nm thick Al-1 wt % Si alloy layer was not formed.

COMPARATIVE EXAMPLE 2

A magnetic disc was prepared in the same manner as in Example 1 except that the 20 -nm thick Al-1 wt % Si alloy layer was replaced by a 20-nm thick Al (pure Al) layer.

COMPARATIVE EXAMPLE 3

A magnetic disc was prepared in the same manner as in Example 31 except that the 20-nm thick Al-1wt % Si alloy layer was not formed.

COMPARATIVE EXAMPLE 4

A magnetic disc was prepared in the same manner as in Example 31 except that the 20-nm thick Al-1wt % Si alloy layer was replaced by a 20-nm thick Al (pure Al) layer.

COMPARATIVE EXAMPLE 5

A magnetic disc was prepared in the same manner as in Example 32 except that the 20-nm thick Al-1wt % Si alloy layer was not formed.

COMPARATIVE EXAMPLE 6

A magnetic disc was prepared in the same manner as in Example 32 except that the 20-nm thick Al-1wt % Si alloy layer was replaced by a 20-nm thick Al (pure Al) layer.
(Properties)

The magnetic discs obtained in the foregoing examples were then measured for their surface roughness Ra, adhesivity of magnetic layer, GHT and CSS durability. The results are set forth in Table 2.

TABLE 2

| Example No. | Ra (nm) | Adhesivity | GHT | CSS durability |
|---|---|---|---|---|
| Example 1 | 1.4 | A | A | 50,000 times or more |
| Example 2 | 1.6 | A | A | 50,000 times or more |
| Example 3 | 1.8 | A | A | 50,000 times or more |
| Example 4 | 1.4 | A | A | 50,000 times or more |
| Example 5 | 1.6 | A | A | 50,000 times or more |
| Example 6 | 1.8 | A | A | 50,000 times or more |
| Example 7 | 1.4 | A | A | 50,000 times or more |
| Example 8 | 1.5 | A | A | 50,000 times or more |
| Example 9 | 1.6 | A | A | 50,000 times or more |
| Example 10 | 1.4 | A | A | 50,000 times or more |
| Example 11 | 1.5 | A | A | 50,000 times or more |
| Example 12 | 1.6 | A | A | 50,000 times or more |
| Example 13 | 1.4 | A | A | 50,000 times or more |
| Example 14 | 1.5 | A | A | 50,000 times or more |
| Example 15 | 1.6 | A | A | 50,000 times or more |
| Example 16 | 1.4 | A | A | 50,000 times or more |
| Example 17 | 1.5 | A | A | 50,000 times or more |
| Example 18 | 1.6 | A | A | 50,000 times or more |
| Example 19 | 1.4 | A | A | 50,000 times or more |
| Example 20 | 1.5 | A | A | 50,000 times or more |
| Example 21 | 1.6 | A | A | 50,000 times or more |
| Example 22 | 1.4 | A | A | 50,000 times or more |
| Example 23 | 1.5 | A | A | 50,000 times or more |
| Example 24 | 1.6 | A | A | 50,000 times or more |
| Example 25 | 1.4 | A | A | 50,000 times or more |
| Example 26 | 1.5 | A | A | 50,000 times or more |
| Example 27 | 1.6 | A | A | 50,000 times or more |
| Example 28 | 1.5 | A | A | 50,000 times or more |
| Example 29 | 1.5 | A | A | 50,000 times or more |

TABLE 2-continued

| Example No. | Ra (nm) | Adhesivity | GHT | CSS durability |
|---|---|---|---|---|
| Example 30 | 1.5 | A | A | 50,000 times or more |
| Example 31 | 1.7 | A | A | 40,000 times |
| Example 32 | 1.5 | A | B | 25,000 times |
| Example 33 | 1.7 | A | A | 35,000 times |
| Example 34 | 1.5 | A | B | 20,000 times |
| Comparative Example 1 | 1.0 | A | A | sticking occurs |
| Comparative Example 2 | 1.8 | B | immeasurable | immeasurable |
| Comparative Example 3 | 1.2 | A | A | sticking occurs |
| Comparative Example 4 | 1.7 | B | immeasurable | immeasurable |
| Comparative Example 5 | 1.3 | A | B | sticking occurs |
| Comparative Example 6 | 1.8 | B | immeasurable | immeasurable |

Ra: measured by a stylus-type profilometer
Adhesivity: A peel test was conducted with Nichiban cellophane tape No. 405 (width: 18 mm; manufactured by Nichiban Co.) in accordance with ASTM D3359-87. The criterion is as follows:
A: No peeling observed
B: Peeling observed partially or entirely at the interface of substrate
GHT: GHT was conducted with MG150T (manufactured by PROQUIP) using a 50% slider head. The criterion is as follows:
A: Passed at a floating height of 1.2 µinch
B: Passed at a floating height of 1.6 µinch
CSS test: A cycle of 5 second operation and 5 second stoppage with a thin film head (Al$_2$O$_3$.TiC slider, manufactured by Yamaha Corp.) was repeated at a head load of 3.5 g, a head float height of 2.8 µinch and 4,500 r.p.m. The number of cycles at which the static friction coefficient (µs) reaches 0.6 was determined.

The magnetic discs of the present invention contain an Al—M alloy layer provided on a substrate and a magnetic layer provided on the Al—M alloy layer. The Al—M alloy interlayer is firmly bonded to the substrate. A magnetic layer is firmly bonded to the substrate via the Al—M alloy interlayer. Thus, a high adhesivity of the layers can be provided. Further, excellent durability can be provided.

Further, since the Al—M alloy layer has an appropriate unevenness on its surface, the magnetic layer and the other layers formed on the Al—M alloy layer also have an appropriate unevenness on the surface thereof, whereby it is possible to reduce the floating height of the magnetic head, provide excellent running properties and CSS durability.

In particular, when a carbon substrate is used as a substrate, better effects are obtained.

EXAMPLE 35

A glassy carbon having a density of 1.5 g/cm$^3$ and a Vickers hardness of 650 was used to prepare a carbon substrate 1. The carbon substrate 1 had an Ra of 0.8 nm as determined by a stylus-type profilometer.

A 100-nm thick Ti layer 7 was sputtered onto the carbon substrate 1 by DC magnetron sputtering at an Ar gas pressure of 2 mTorr and a carbon substrate temperature of 250° C. The surface of the Ti layer 7 had an Ra of 1.0 nm.

A 20-nm thick Al-10 wt % Si alloy layer 3 was sputtered onto the surface of the Ti layer 7 by DC magnetron sputtering at an Ar gas pressure of 2 mTorr and a carbon substrate temperature of 260° C.

A 40-nm thick Cr layer 3 on which a 50-nm thick CoCrPt alloy magnetic layer 4 was further formed was sputtered onto the surface of the Al-10 wt % Si alloy layer 2 by DC magnetron sputtering.

A 15-nm thick protective layer (glassy carbon layer) 5 was sputtered onto the surface of the CoCrPt alloy magnetic layer 4 by DC magnetron sputtering.

Thereafter, a solution of FONBRIN Z03 was applied to the protective layer to form a 1.5-nm thick lubricant layer 6. Thus, a magnetic disc was obtained as shown in FIGS. 2A and 2B.

EXAMPLES 36 TO 43

Magnetic discs were prepared in the same manner as in Example 35 except that the 100-nm thick Ti layer 7 was replaced by 100-nm thick M' layers (metallic layers) set forth in Table 3, respectively, and the 20-nm thick Al-10 wt % Si alloy layer 2 was replaced by 20-nm thick Al—M alloy layers set forth in Table 3, respectively.

TABLE 3

| Example No. | M' layer | Al—M alloy layer | Ra of M' layer |
|---|---|---|---|
| Example 36 | W | Al-10 wt % Si | 1.0 |
| Example 37 | Si | Al-10 wt % Si | 0.9 |
| Example 38 | Ta | Al-10 wt % Si | 1.0 |
| Example 39 | Zr | Al-10 wt % Si | 1.0 |
| Example 40 | Y | Al-10 wt % Si | 0.9 |
| Example 41 | V | Al-10 wt % Si | 1.0 |
| Example 42 | Mo | Al-10 wt % Si | 1.1 |
| Example 43 | Ti | Al-5 wt % Si-5 wt % Cr | 1.0 |

Properties

The magnetic discs obtained in the foregoing examples were then measured for their surface roughness Ra, adhesivity of the magnetic layer, GHT, initial friction coefficient and CSS durability. The results are set forth in Table 4.

TABLE 4

| Example No. | Ra (nm) | Adhesivity | GHT | Initial coefficient | CSS durability |
|---|---|---|---|---|---|
| Example 35 | 1.8 | A | A | 0.1 | 100K or more |
| Example 36 | 1.8 | A | A | 0.1 | 100K or more |
| Example 37 | 1.7 | A | A | 0.1 | 100K or more |
| Example 3 | 1.8 | A | A | 0.1 | 100K or more |
| Example 39 | 1.8 | A | A | 0.1 | 100K or more |
| Example 40 | 1.7 | A | A | 0.1 | 100K or more |
| Example 41 | 1.8 | A | A | 0.1 | 100K or more |
| Example 42 | 1.9 | A | A | 0.1 | 100K or more |
| Example 43 | 1.6 | A | A | 0.1 | 100K or more |

Ra: measured by a stylus-type profilometer
Adhesivity: A peel test was conducted with Nichiban cellophane tape No. 405 (width: 18 mm; manufactured by Nichiban Co.) in accordance with ASTM D3359-87. The criterion is as follows:
A: No peeling observed
B: Peeling observed partially or entirely at the interface of substrate
GHT: GHT was conducted with MG150T (manufactured by PROQUIP) using a 50% slider head. The criterion is as follows:
A: Passed at a floating height of 1.2 μinch
B: Passed at a floating height of 1.6 μinch
CSS test: A cycle of a 5 second operation and a 5 second stoppage with a thin film head ($Al_2O_3$.TiC slider, manufactured by Yamaha Corp.) was repeated at a head load of 3.5 g, a head float height of 2.8 μinch and 4,500 r.p.m. The number of cycles at which the static friction coefficient (μs) reaches 0.6 was determined. (K indicates 1,000.)

The magnetic discs of the present invention contain a metal M' layer and an Al—M alloy layer provided on a substrate and a magnetic layer provided on the Al—M alloy layer. The Al—M alloy layer is firmly bonded to the metal M' layer. A magnetic layer is firmly bonded to the substrate via the Al—M alloy interlayer. Thus, a high adhesivity of the layers can be provided. Further, excellent durability can be provided.

Since the Al—M alloy layer having an appropriate unevenness was formed, the magnetic layer and the other layers formed on the Al—M alloy layer also have an appropriate unevenness on the surface thereof, whereby it is possible to reduce the floating height of the magnetic head, provide excellent running properties and CSS durability.

Moreover, a low initial friction coefficient can be provided, giving excellent running properties. In particular, when a carbon substrate is used as the substrate, better effects are obtained.

In accordance with the present invention, a magnetic recording medium which enables floating of a magnetic head at a low height above the magnetic disc, which can cope with a high density recording, which is excellent in running properties and durability, can be provided.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic recording medium comprising:
   (i) a substrate,
   (ii) a continuous uneven layer formed by a PVD method on said substrate, and
   (iii) a metallic magnetic layer, on said uneven layer;
   wherein said uneven layer comprises at least one alloy selected from
   (a) $Al_{100-a}Si_a$, wherein a has the range of from 0.2 to 15% by weight,
   (b) $Al_{100-b}Cr_b$, wherein b has the range of from 0.1 to 10% by weight,
   (c) $Al_{100-c}Ta_c$, wherein c has the range of from 0.1 to 3% by weight,
   (d) $Al_{100-d}Ti_d$, wherein d has the range of from 0.5 to 15% by weight,
   (e) $Al_{100-e}Zr_e$, wherein e has the range of from 0.1 to 9% by weight,
   (f) $Al_{100-f}Y_f$, wherein f has the range of from 0.1 to 10% by weight,
   (g) $Al_{100-g}Mo_g$, wherein g has the range of from 0.2 to 10% by weight,
   (h) $Al_{100-h}W_h$, wherein h has the range from 0.2 to 10% by weight, and
   (i) $Al_{100-j}V_j$, wherein j has the range of from 0.5 to 10% by weight.

2. The magnetic recording medium of claim 1, wherein said uneven layer is a continuous layer.

3. The magnetic recording medium of claim 1, further comprising (iv) a layer comprising Cr, between said uneven layer (ii) and said metallic magnetic layer (iii).

4. The magnetic recording medium of claim 1, wherein the thickness of said uneven layer is from 5 nm to 100 nm.

5. The magnetic recording medium of claim 1, wherein said substrate (i) comprises carbon.

6. The magnetic recording medium of claim 1, further comprising (v) a metallic layer comprising (M') a second metal capable of forming a carbide, between said uneven layer (ii) and said substrate (i).

7. The magnetic recording medium of claim 1, wherein said uneven layer (ii) has a thickness of 5-60 nm.

8. The magnetic recording medium of claim 1, wherein said uneven layer (ii) has a roughness Ra of 1–5 nm.

9. The magnetic recording medium of claim 1, wherein said uneven layer (ii) has a roughness Ra of 1–3 nm.

10. The magnetic recording medium of claim 1, wherein said uneven layer (ii) has a Rp of 2–30 nm.

11. The magnetic recording medium of claim 1, wherein said uneven layer (ii) has a Rp of 3–8 nm.

12. The magnetic recording medium of claim 6, wherein said metallic layer (v) has a thickness of 10–200 nm.

13. The magnetic recording medium of claim 6, wherein said metallic layer (v) has a roughness Ra of 0.9–1.1 nm.

14. The magnetic recording medium of claim 6, wherein said metallic layer (v) has a Rp of 2–4 nm.

15. The magnetic recording medium of claim 6, wherein said metallic layer (v) is a continuous layer.

16. The magnetic recording medium of claim 1, further comprising (vi) a protective layer.

17. The magnetic recording medium of claim 1, further comprising (vii) a lubricant layer.

18. The magnetic recording medium of claim 6, wherein said second metal capable of forming a carbide (M') is selected from the group consisting of Si, Cr, Ta, Ti, Zr, Y, Mo, W and V.

19. The magnetic recording medium of claim 1, wherein said substrate consists essentially of carbon.

20. The magnetic recording medium of claim 1, wherein said uneven layer (ii) consists essentially of an alloy selected from the group consisting of an Al—Si alloy and an Al—Cr alloy.

* * * * *